United States Patent [19]

Kersting

[11] Patent Number: 5,042,849
[45] Date of Patent: Aug. 27, 1991

[54] SLEEVE FOR A FLEXIBLE HOSE COUPLING

[75] Inventor: Wolfgang Kersting, Eschen, Liechtenstein

[73] Assignee: WBT Wirtschaftsberatungs Trust Reg., Switzerland

[21] Appl. No.: 594,361

[22] Filed: Oct. 9, 1990

[30] Foreign Application Priority Data

Oct. 16, 1989 [CH] Switzerland .................. 3768/89

[51] Int. Cl.$^5$ .............................................. F16L 37/08
[52] U.S. Cl. ...................................... 285/312; 285/423; 285/915; 411/383; 411/411; 411/908
[58] Field of Search ............. 285/312, 423, 903, 392, 285/915, 490; 411/383, 411, 436, 908

[56] References Cited

U.S. PATENT DOCUMENTS

| 720,580 | 2/1903 | Greenfield | 411/411 |
|---|---|---|---|
| 1,512,895 | 10/1924 | Kraft | 285/312 |
| 2,804,320 | 8/1957 | Pearson | 285/392 |
| 3,245,701 | 4/1966 | Leopold et al. | 285/915 X |
| 3,264,013 | 8/1966 | Richardson et al. | 285/423 X |
| 3,784,239 | 1/1974 | Carter | 285/423 X |
| 3,796,449 | 3/1974 | McLaughlin et al. | 285/423 X |
| 4,059,296 | 11/1977 | Panourgias | 285/423 X |
| 4,093,280 | 6/1978 | Yoshizawa | 285/915 X |
| 4,126,338 | 11/1978 | Coel et al. | 285/392 |
| 4,222,593 | 9/1980 | Lauffenburger | 285/915 |
| 4,398,754 | 8/1983 | Caroleo | 285/915 |
| 4,938,511 | 7/1990 | Kersting | 285/312 |

Primary Examiner—Dave W. Arola
Attorney, Agent, or Firm—Wood, Phillips, Mason, Rectenwald & VanSanten

[57] ABSTRACT

Adjacent the free end of a flexible hose (22) an external thread (20) of elastomeric material is bonded or vulcanized to the external surface (21) of hose (22). A sleeve (1) is threaded onto and adhesively bonded to the external thread (20). The sleeve (1) consists of a sleeve body (2) of plastic or elastomeric material and a metallic ring (3) preferably of spring steel. The ring (3) is molded into the sleeve body (2). Part of its surface constitutes a shoulder for engagement by a cam of a coupling lock. The sleeve (1) is cheaper to manufacture and more durable than metallic sleeves.

9 Claims, 2 Drawing Sheets

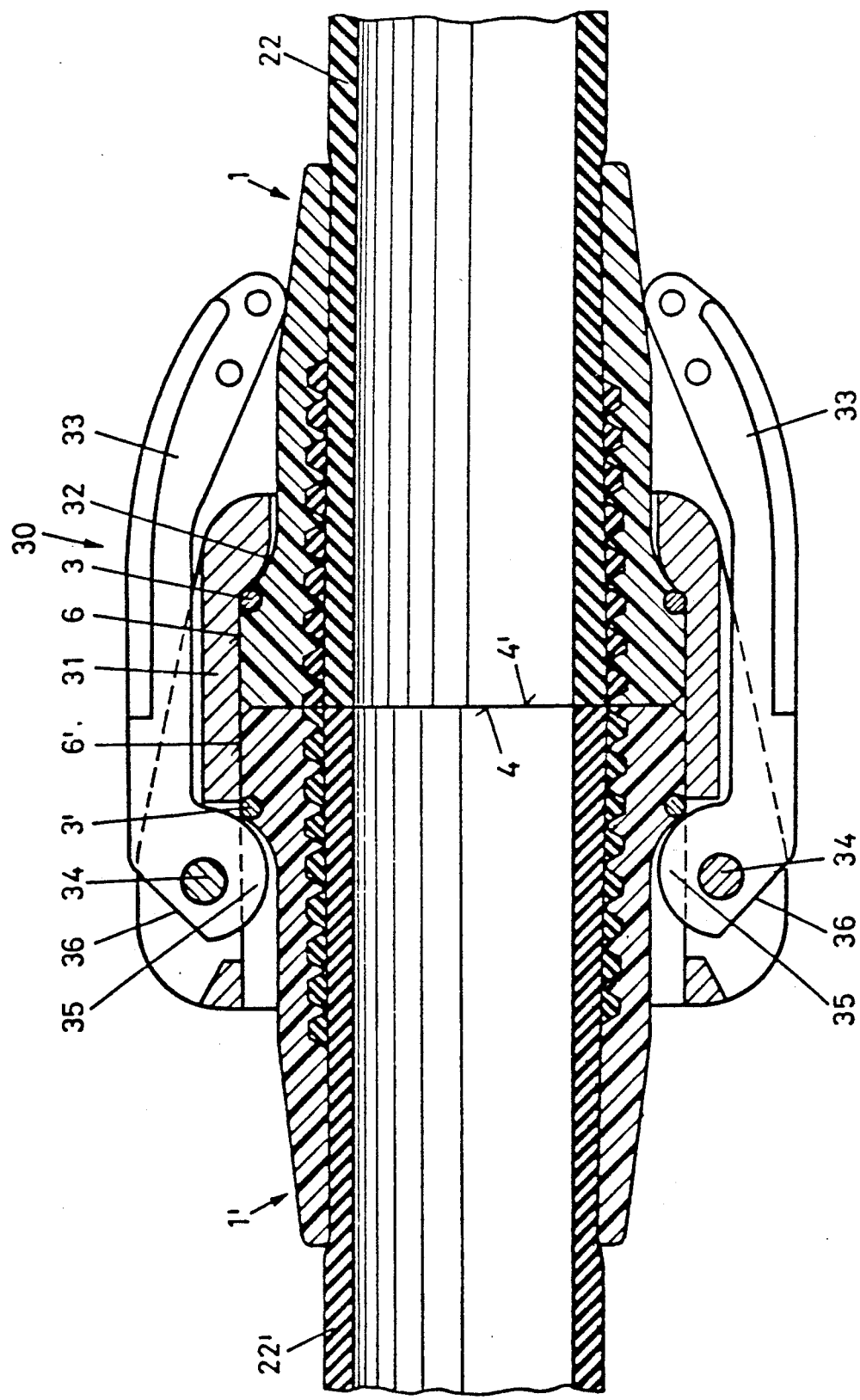

SLEEVE FOR A FLEXIBLE HOSE COUPLING

BACKGROUND OF THE INVENTION

U.S. Pat. No. 4,938,511 describes a coupling for flexible hoses. This coupling is mainly used in applications for conveying mortar or concrete through the hoses. In such applications it is important that there is no constriction in the free cross sectional area of the hose through the coupling. To this end, U.S. Pat. No. 4,938,511 proposes to bond an external thread of elastomeric material onto the outer cylindrical surface of the hose end, to apply an adhesive to that external thread and then to screw a metallic sleeve onto that thread. After hardening of the adhesive the sleeve is permanently fixed on the hose end. Two adjacent identical hose ends can now be coupled by a coupling lock. This hose coupling has worked well in practice.

SUMMARY OF THE INVENTION

It is an object of the present invention to provide an improved hose coupling of the above mentioned type.

In a first aspect the present invention provides a sleeve for a flexible hose coupling. The sleeve has a planar end surface and a shoulder axially spaced from said end surface for engagement by an abutting means of a coupling lock. The sleeve consists of a plastic or elastomeric sleeve body and a metallic ring embedded in the sleeve body, part of the surface of said ring constituting said shoulder.

In another aspect the present invention provides a hose coupling comprising:
a first flexible hose having a first end;
a second flexible hose having a second end;
a first external thread bonded onto the external surface of said first hose adjacent its first end;
a second external thread bonded onto the external surface of said second hose adjacent its second end;
a first tubular internally threaded sleeve threaded onto and adhesively bonded to said first external thread, said first sleeve having a first shoulder facing away from said first end, said first sleeve consisting of a plastic or elastomeric sleeve body and a metallic ring embedded in the sleeve body, part of the surface of said ring constituting said first shoulder;
a second tubular internally threaded sleeve identical to said first sleeve threaded onto and adhesively bonded to said second external thread, said second sleeve having a second shoulder facing away from said second end; and
a coupling lock having an abutting means abutting, in the coupled state of the hose coupling, against said first shoulder, and a pivotable cam on a lever abutting, in the coupled state of the hose coupling, against said second shoulder and urging said first and second sleeves axially toward each other, the lever being pivotable into a position in which said second hose with said second sleeve is axially removable from said coupling lock.

To make the sleeve of plastic or elastomeric material not only has the advantage that it is cheaper in manufacturing but it surprisingly is also more durable. Experiments in the rough environment of construction sites have shown that the metallic sleeves formerly used relatively often get damaged when the hose end is dropped to the rough ground. A good seal is then often no more possible. When, in accordance with the present invention, the sleeve is mainly of plastic or elastomeric material, the shock when hitting a hard object is elastically absorbed without damaging the sleeve. A further advantage of the plastic or elastomeric sleeve is that a sealing ring between adjacent, coupled hose ends, which was found useful in the prior art coupling, can be deleted.

BRIEF DESCRIPTION OF THE DRAWING

A preferred embodiment of the present invention is hereinafter described with reference to the drawings, in which FIG. 3 shows the complete hose coupling.

DETAILED DESCRIPTION OF A PREFERRED EMBODIMENT

Figure 1:
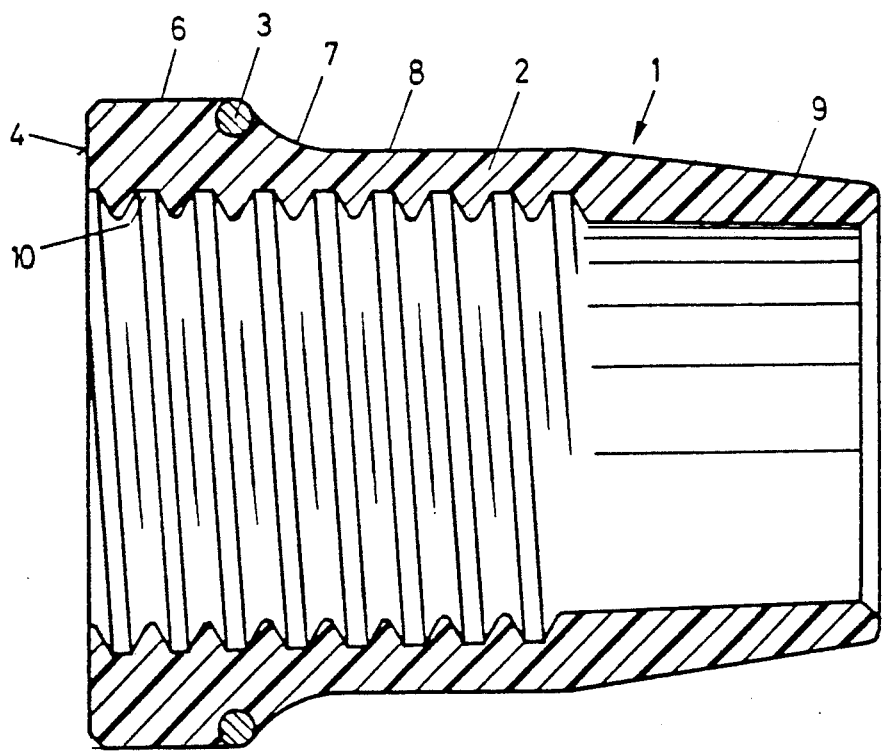
FIG. 1 shows a longitudinal cross section of a sleeve for a hose coupling.

The sleeve 1 of FIG. 1 consists of a tubular sleeve body 2 of a plastic or elastomeric material and a metallic ring 3. Preferably, the material of the sleeve body 2 is injection moldable, i.e. a thermoplast or an injection moldable elastomer. The ring 3 preferably is manufactured of spring steel and may be closed or it may be slit along a plane containing the axis of the sleeve 1 or being inclined to that axis. The body 2 has a plane radial front surface 4. The ring 3 has a circular cross section, is spaced from the front surface 4 and has an external diameter equal to the diameter of a cylindrical external surface 6 of the sleeve body 2 extending between the front surface 4 and the ring 3. Adjoining the ring 3 on the opposite side of cylindrical surface 6 the sleeve body 2 has a toroidal constriction 7 which is followed by a cylindrical section 8. A tapered section 9 adjoins section 8. The ring 3 preferably is molded into the body 2 during injection molding. It constitutes a wear resistant strong shoulder for engagement by a cam surface of a coupling lock.

The sleeve body 2 has an internal thread 10 starting from end surface 4 and extending over about two third of the length of the sleeve 1. The thread 10 serves to thread the sleeve onto an external thread 20 of elastomeric material bonded onto the exterior surface 21 of a flexible hose 22 adjacent its end (FIG. 2).

For mounting the sleeve 1 onto the hose 22 first the sleeve is pushed over the hose end far enough that the exterior surface 21 of the hose end is exposed. Then the external thread 20 is bonded or vulcanised to the surface 21 e.g. by helically winding a rod of rubber with a trapezoidal cross section onto the surface 21 and bonding the two parts together. Finally, the external thread 22 is coated with an adhesive, e.g. with a rubber cement, and the sleeve 1 is threaded onto the thread 22 such that the front face 4 of sleeve 1 is flush with the front face of the hose 20.

Figure 2:
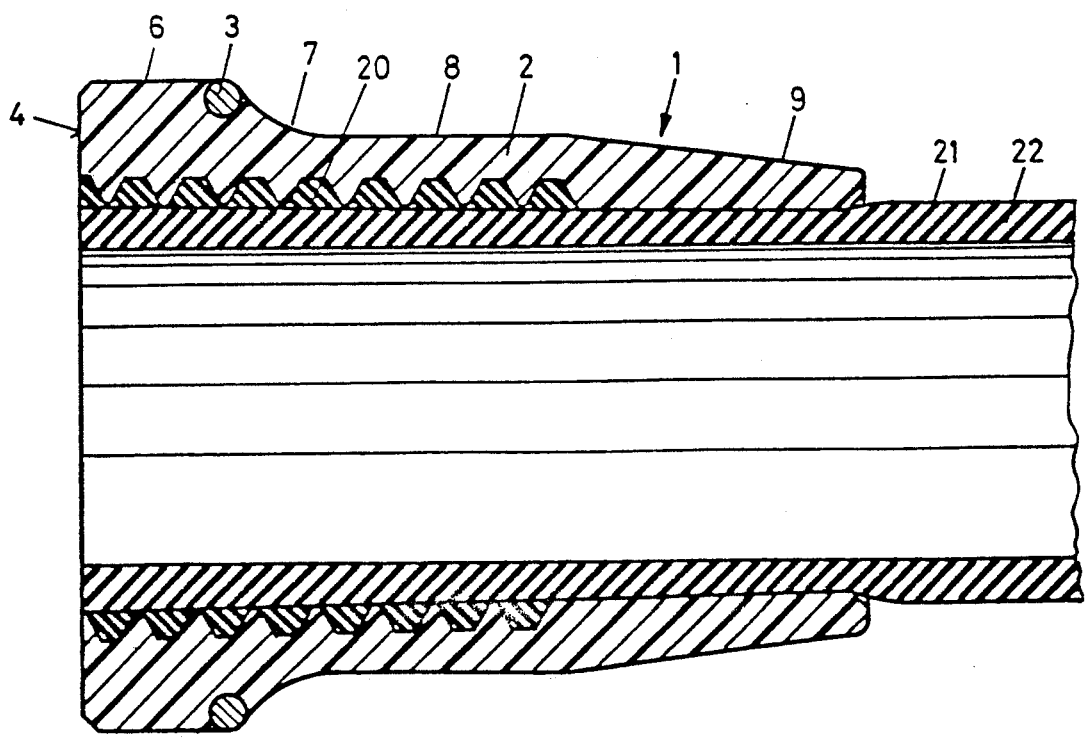
FIG. 2 shows the sleeve of FIG. 1 mounted on a hose.

FIG. 3 shows a coupling 30 of two hoses 22, 22' with sleeves 1, 1' according to FIG. 2. A coupling lock 31 is slid over the surfaces 6, 6' of sleeves 1, 1' and rests with a toroidal, internal flange 32 against ring 3 of sleeve 1. On the opposite end two levers 33 are pivotably supported by pins 34. The levers 33 have eccentric cams 35 which abut against ring 3' of sleeve 1' and press the two sleeves 1, 1' axially against one another, in the position of the levers shown in FIG. 3. When the levers 33 are pivoted by about 135° a flatening 36 aligns with the internal diameter of the coupling lock 31 so that the hose 22' with sleeve 1' can be axially removed from or inserted into the coupling lock 31.

What is claimed is:

1. A sleeve for permanently fixing onto an external surface of a flexible hose adjacent a free end thereof, the sleeve having a planar end surface and spaced from the end surface a shoulder for engagement by a cam surface of a coupling lock, said sleeve consisting of a sleeve body of plastic material and a metallic ring partially embedded in the sleeve body, part of the surface of said ring being exposed and constituting said shoulder for engagement by the cam surface.

2. The sleeve according to claim 1, wherein said ring is made of spring steel.

3. The sleeve according to claim 1, wherein said ring is slit.

4. The sleeve according to claim 1 wherein said ring has a circular cross section.

5. The sleeve according to claim 1, wherein said ring is molded into said sleeve body.

6. The sleeve according to claim 1, wherein said sleeve body has an internal thread for threading onto an external thread bonded onto an external surface of a hose adjacent its end.

7. The sleeve according to claim 1, wherein the plastic material of the sleeve body is an elastomer.

8. A hose coupling comprising:
a first flexible hose having a first end;
a second flexible hose having a second end;
a first external thread bonded onto the external surface of said first hose adjacent its first end;
a second external thread bonded onto the external surface of said second hose adjacent its second end;
a first tubular internally threaded sleeve threaded onto and adhesively bonded to said first external thread, said first sleeve having a first shoulder facing away from said first end, said first sleeve consisting of a plastic material forming a sleeve body and a metallic ring partially embedded in the sleeve body, part of the surface of said ring being exposed and constituting said first shoulder;
a second tubular internally threaded sleeve identical to said first sleeve and threaded onto and adhesively bonded to said second external thread, said second sleeve having a second shoulder facing away from said second end; and
a coupling lock having an abutting means abutting, in the coupled state of the hose coupling, against said metallic ring in said first shoulder, and a pivotable cam on a lever abutting, in the coupled state of the hose coupling, against said second shoulder and urging said first and second sleeves axially toward each other, the lever being pivotable into a position in which said second hose with said second sleeve is axially removable from said coupling lock.

9. The hose coupling according to claim 7, wherein the plastic material of the sleeve body of the first and second sleeves is an elastomer.

* * * * *